Oct. 12, 1948.　　　　F. A. HURD　　　　2,450,964
MACHINE TOOL
Filed Sept. 16, 1944　　　　　　　　　　8 Sheets-Sheet 2

FIG·2

INVENTOR:
Fraser A. Hurd,
BY
Boldell & Thompson
ATTORNEYS.

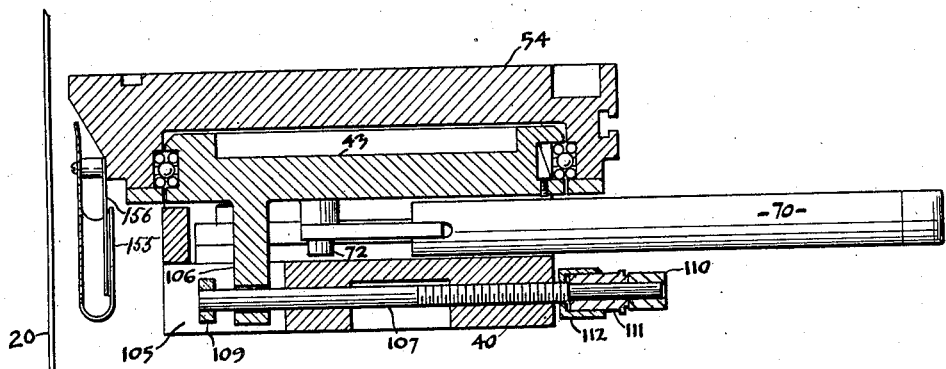
FIG·5  SEC·5-5
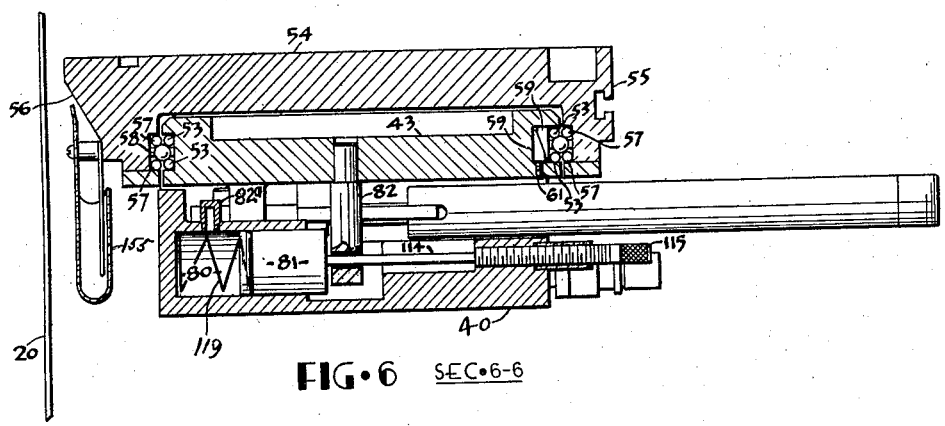
FIG·6  SEC·6-6
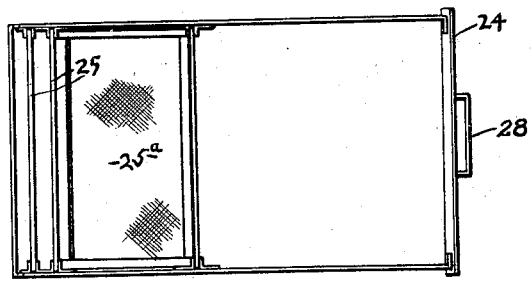
FIG·7
INVENTOR:
Fraser A. Hurd,
BY Bodell & Thompson
ATTORNEYS.

Oct. 12, 1948.     F. A. HURD     2,450,964
MACHINE TOOL
Filed Sept. 16, 1944     8 Sheets-Sheet 6

INVENTOR:
Fraser A. Hurd,
BY
Bodell & Thompson
ATTORNEYS.

Oct. 12, 1948.     F. A. HURD     2,450,964
MACHINE TOOL
Filed Sept. 16, 1944     8 Sheets-Sheet 7
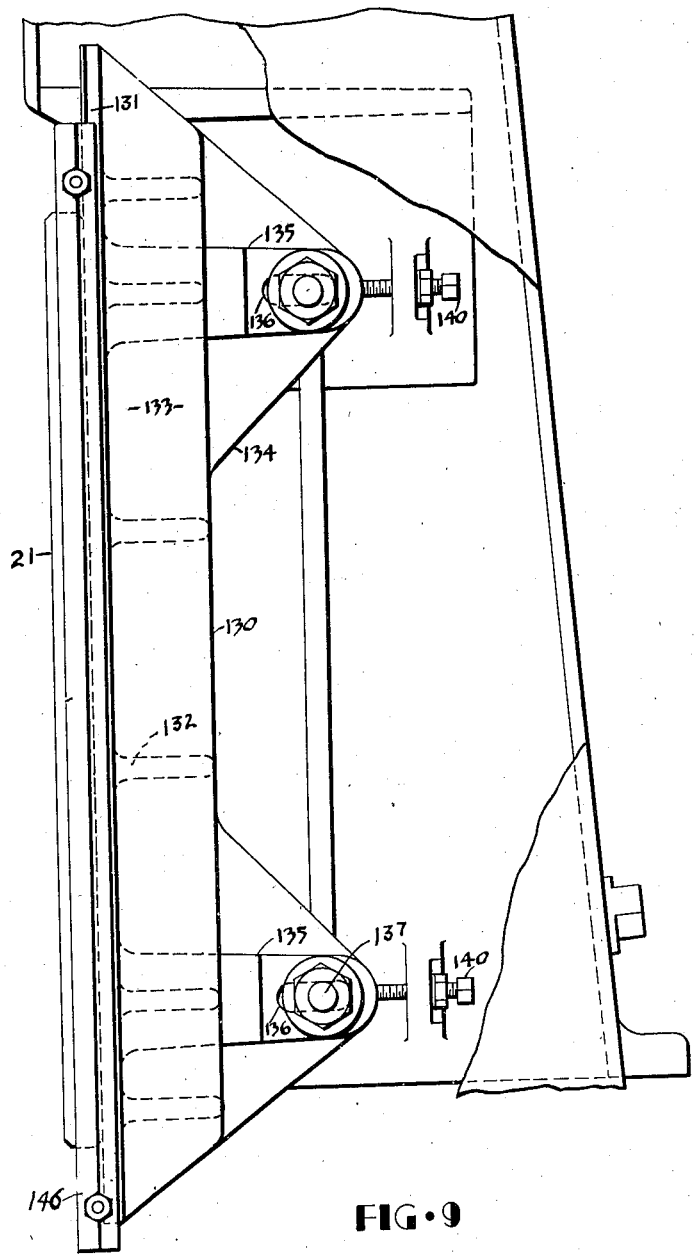
FIG·9
INVENTOR:
Fraser A. Hurd,
BY Bodell & Thompson
ATTORNEYS.

Oct. 12, 1948.　　　F. A. HURD　　　2,450,964
MACHINE TOOL
Filed Sept. 16, 1944　　　8 Sheets-Sheet 8
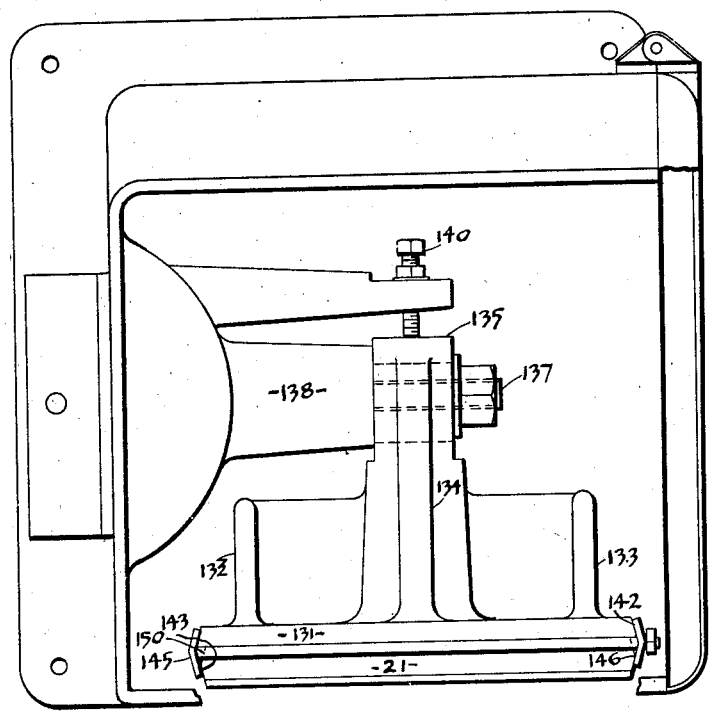
FIG·10
INVENTOR:
Fraser A. Hurd,
BY
Bodell & Thompson
ATTORNEYS.

Patented Oct. 12, 1948

2,450,964

UNITED STATES PATENT OFFICE 2,450,964

MACHINE TOOL

Fraser A. Hurd, Liverpool, N. Y.

Application September 16, 1944, Serial No. 554,369

5 Claims. (Cl. 51—143)

This invention relates to grinding machines of the abrasive belt type. It has as an object a machine tool of the type referred to which is particularly well suited for the rapid and precision grinding of various parts, and embodies a particularly novel work supporting table which is movable clear of the abrasive belt to a loading and unloading position, and includes means operable to automatically feed the table inwardly toward the abrasive belt when the operator moves the table laterally from the loading and unloading station to a position where the work is engaged by the belt.

The invention has as a further object a machine of the type referred to wherein the inward feed movement of the work table toward the belt is adjustable as to the distance the table travels towards the belt and as to the rate of speed of such travel, all whereby the grinding operation is entirely automatic permitting the machine to be operated by unskilled help.

The invention consists in the novel features and in the combinations and constructions hereinafter set forth and claimed.

In describing this invention, reference is had to the accompanying drawings in which like characters designate corresponding parts in all the views.

Figure 5 is a view taken on line 5—5, Figure 3.

Figure 6 is a view taken on line 6—6, Figure 3.

Figure 7 is a plan view of the chip collecting drawer.

Figure 9 is a side elevational view of the platen and platen support, and contiguous portion of the housing with the side removed.

Figure 10 is a top plan view of the platen and platen support.

Figure 1:
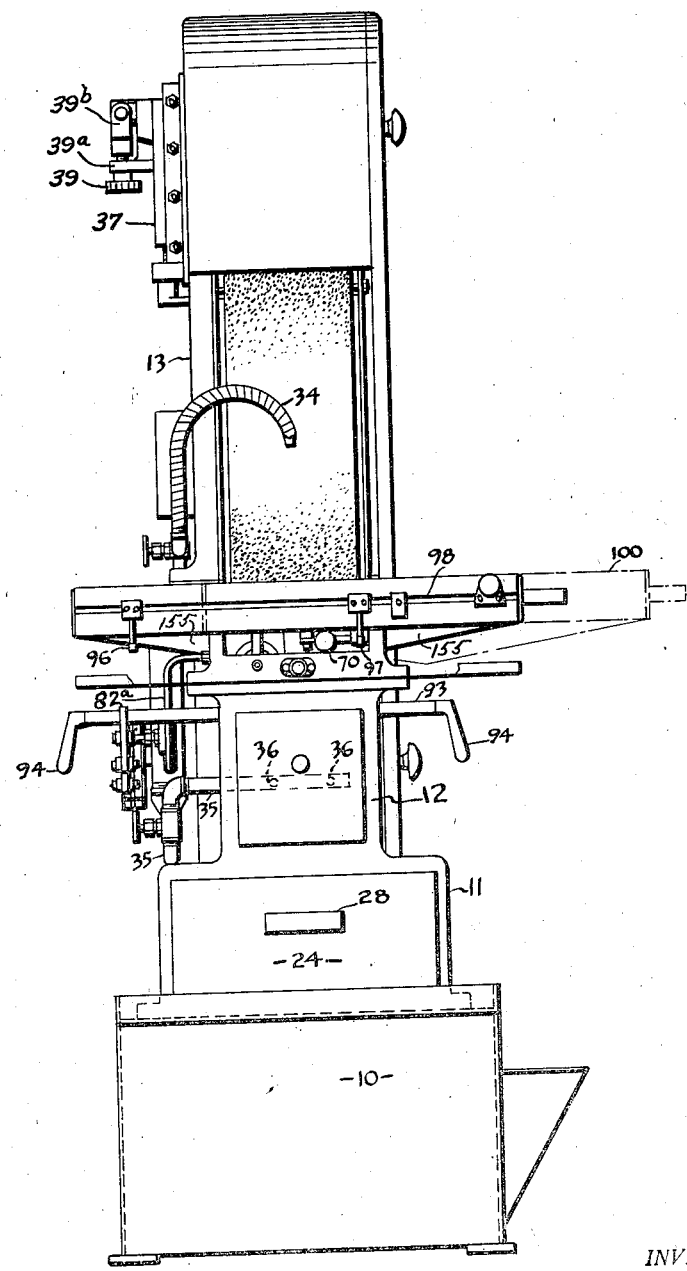
Figure 1 is a front elevational view of a machine embodying my invention.
Figure 2:
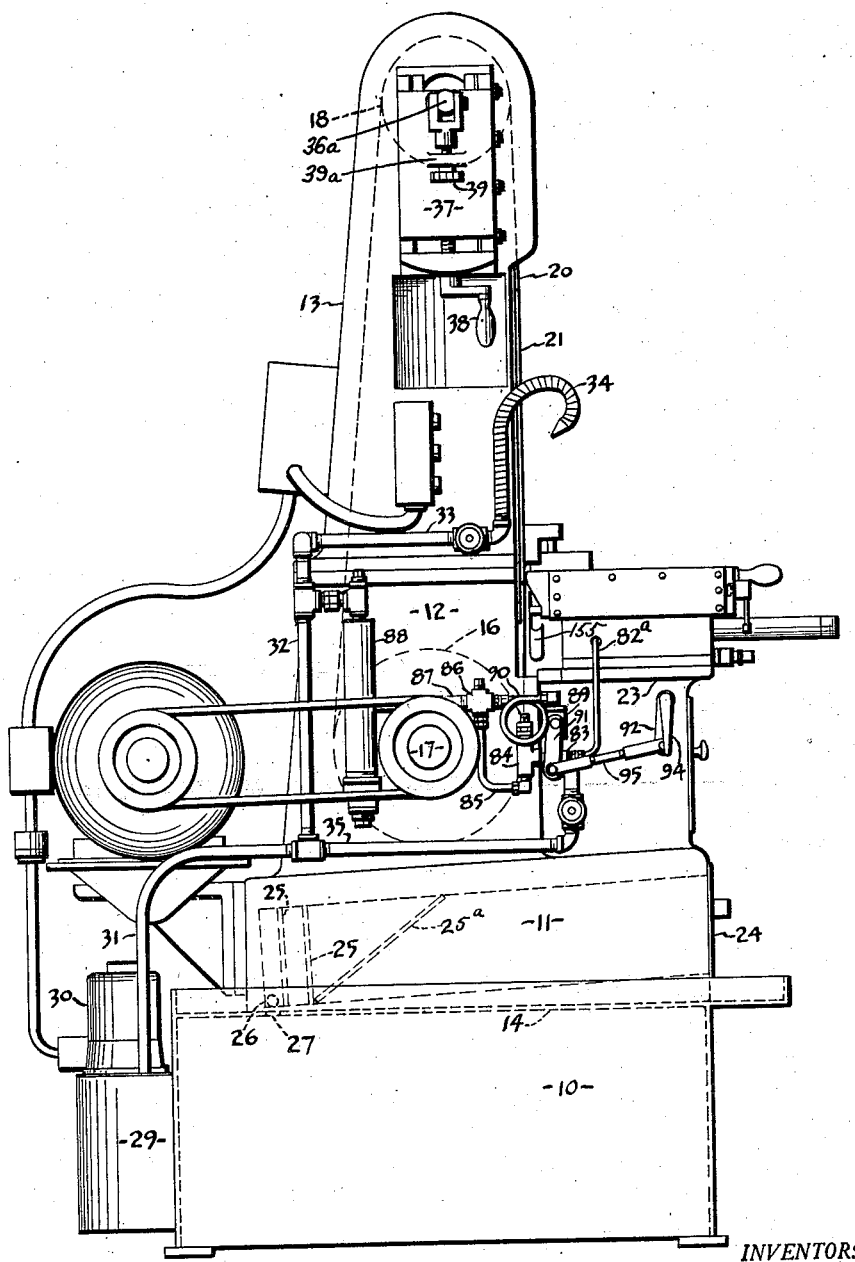
Figure 2 is a side elevational view of the machine shown in Figure 1.

The frame of the machine consists of a base 10, an intermediate portion 11, an upper portion 12, and a top member 13 mounted upon the upper portion 12. The portions 10, 11, are separated by a partition 14, and the parts 12, 13, are of box formation forming an enclosed housing. A pulley 16 is mounted upon shaft 17 journalled in the lower portion of the housing—that is in the upper portion 12 of the lower frame structure. A pulley 18 is journalled in the upper end of the top section 13. The abrasive belt 20 is trained over the pulleys 16, 18, and the forward side of the housing is open to expose the forward run of the belt 20 which passes over a flat platen 21 supported within the housing in a manner hereinafter described. The top portion 12 extends forwardly to form a support 23 on which the work table is mounted.

The base 10 forms a tank for the coolant solution. A chip collector in the form of a drawer 24 is removably mounted in the intermediate portion 11 and is provided with transversely extending screens 25 adjacent the inner end thereof, and the drawer is provided with openings 26, and the partition 14 with an opening 27. One of the screens as 25ª is inclined upwardly from a point contiguous to the discharge opening 26. When the machine is used to operate on non-ferrous materials, such as aluminum, bronze, plastic, etc., the chips have a tendency to float upon the coolant collected in the drawer 24. With the inclined screen 25ª, the chips engage the under side thereof and are more readily dislodged therefrom by the vibration of the machine than in the case of the vertically arranged screens 25. This permits a more rapid separation of the chips from the coolant and prevents plugging of the screens. The drawer 24 is provided with a handle 28.

The coolant is pumped from the tank in the base 10 by a pump 29 driven by a motor 30—the solution being pumped through the conduits 31, 32, 33, and discharged on the face of the belt by the flexible conduit 34. The solution is also pumped through a conduit 35 and discharged through spray nozzles 36 in the lower portion of the housing. The solution is discharged, together with the chips removed by the abrasive action, to the drawer 24. The chips are retained in the drawer by the screens 25, and the strained coolant returns to the tank through the openings 27, 28.

The upper pulley 18 is journalled on a shaft 36ª pivoted on block 37 slidable vertically on the exterior of the upper housing member 13 and being adjusted vertically by means of hand crank 38. The axis 36ª of the roller is adjusted by screw 39 extending through a boss 39ª on block 37 and threading into a yoke 39ᵇ pivotally connected to the shaft 36ª in order to obtain a proper tracking of the belt 20 on the pulleys 16, 18.

The work supporting table consists of a base member 40 mounted upon the extending portion 23 of the upper portion 12. The base member 40 is substantially of U formation having upwardly extending leg portions 41, 42, arranged in spaced apart parallel relationship and extending perpendicular to the face of the belt 20.

The table further includes an intermediate section 43 which is slidably mounted between the legs 41, 42, of the base portion. As here shown, opposite sides of the intermediate member 43 are provided with rectangular grooves, and the confronting sides of the legs 41, 42, of the base member 40 are formed with similar grooves. These grooves, in conjunction with the grooves formed in the sides of the table, form a rectangular recess in which rods 46, 47, are mounted. The rods 46 form one pair mounted in the recess of the legs 41, 42, and the rods 47 form a pair mounted in the recess at each side of the intermediate member 43. A series of balls 48 are arranged between the two pairs of rods at each side of the intermediate member, thereby forming an antifriction mounting to permit the intermediate member to be readily moved toward and from the abrasive belt 20.

Means is provided for maintaining the rods 46, 47, and the balls 48 in contact. This is accomplished by a pair of wedge members 49, 50, positioned in the recess formed in the intermediate member — the wedge member 50 being movable toward the wedge member 49 by a screw 51 threading through the top of the intermediate member and engaging the wedge member 50. This effects lateral movement of the wedge member 49 which is positioned in engagement with the pairs of rods 47. In this manner, the intermediate member is mounted with no lost motion or play. However, the intermediate member can be moved relative to the base member with substantially no frictional resistance.

The front and rear sides of the intermediate member 43 are also provided with similar grooves in which pairs of rods 53 are mounted, and the table 54 is formed with depending sides 55, 56, also formed with like grooves to receive the pairs of rods 57. This mounting is similar to the mounting of the intermediate member and includes a series of balls 58 arranged between like pairs of the rods 53, 57, and the antifriction mounting structure is likewise adjusted by wedge members 59, 60, by screws 61.

The table 54 is of appreciable greater length than the width of the base section 40 to provide a substantial travel of the table transversely of the belt 20. The table is provided with suitable handles 65, 66, whereby it can be conveniently moved transversely of the belt. Means is provided for automatically feeding the table inwardly, this inward motion being completed while the table is in operating position. That is, while the work is positioned to engage the abrasive belt 20.

Figure 3:
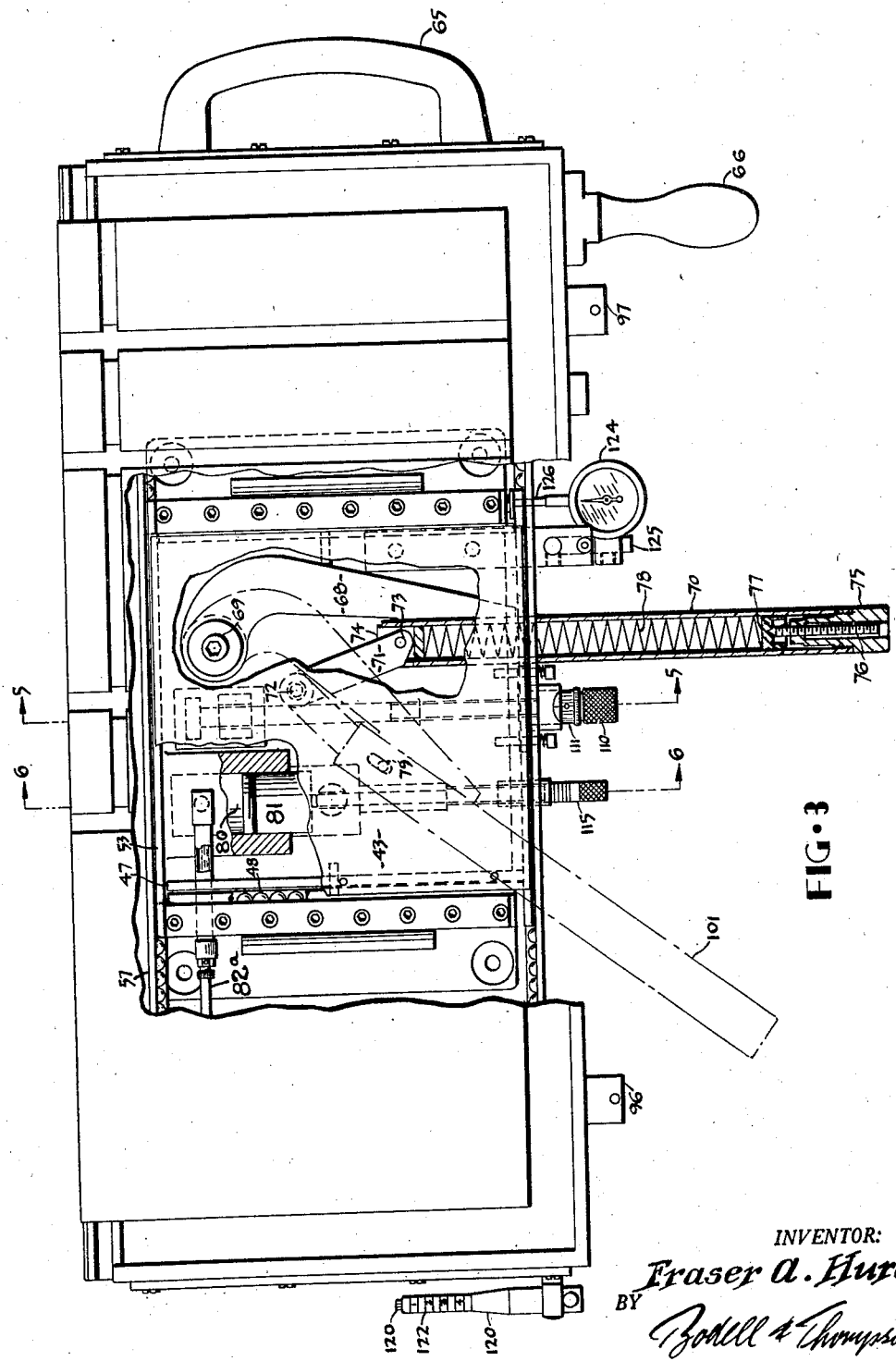
Figure 3 is a top plan view of the work supporting table with parts broken away and parts shown in section.
Figure 4:
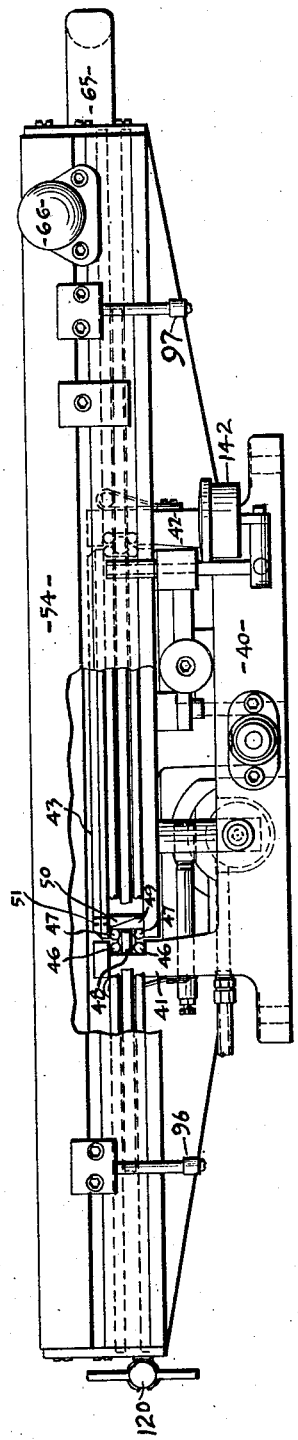
Figure 4 is an enlarged side elevational view of the work table with parts broken away.

A lever 68 is pivotally mounted on a stud 69 carried by the base member 40, and the lever is provided with a tubular handle portion 70 extending forwardly from the base member. A link 71 is pivotally connected at one end to a stud 72 carried by the intermediate member 43. The opposite end of the link 71 is pivotally connected by pin 73 to a bifurcated cylindrical block 74 slidably mounted in the tubular handle 70. The outer end of the handle 70 is provided with a threaded closure 75 which is internally threaded to receive an adjusting screw 76, the inner end of which engages a cylindrical member 77, and a helical compression spring 78 is interposed between the member 77 and the block 74. The inner end of the tubular handle 70 is formed with an elongated slot 79. The arrangement is such that as the lever 68 is moved in a clockwise direction (Figure 3), the intermediate member 43 and the table 54 carried thereby, are moved inwardly toward the abrasive belt 20. However, this inward movement is opposed by a dash pot arrangement comprising a cylinder 80 formed in the base member 40 and in which is slidably mounted a piston 81. The outer end of the piston is engaged by a stud 82 carried by and depending from the intermediate member 43, see Figure 6.

Fluid is supplied to the cylinder 80 through a tube 82a. The opposite end of the tube is connected to a T 83. Fluid is fed to the T 83 through a check valve 84 connected by tube 85 to a T 86 which, in turn, is connected by pipe 87 to a surge chamber 88 connected to the pipe 32 of the coolant system. The branch opening of the T 83 is connected to a bleeder valve 89, the opposite side of which is connected to the T fitting 86 through tube 90.

The bleeder valve 89 is provided with an operating member 91 connected to an arm 92 secured to a shaft 93 journalled in the top base portion 12 and extending laterally from both sides thereof and being provided with handles 94 on each end. The connection between the operating member 91 of the bleeder valve and the arm 92 of shaft 93 consists of an adjustable link 95.

The handle 70 of lever 68 is actuated by depending members 96, 97, secured to the front edge of the table. These members are adjustably mounted in a T slot 98, whereby they can be adjusted along the edge of the table and secured in adjusted position. As the table is moved from the loading and unloading station, as represented by dotted outline 100, Figure 1, to the full-line operating position, the lever handle 70 is engaged by the member 97 and is moved to the dotted position 101, Figure 3, whereupon the spring 78 is compressed, as previously explained, the toggle locked, and the intermediate member and table are urged inwardly, whereupon the stud 82 engages the rear of the piston 81, and the intermediate member and table are permitted to move inwardly toward the belt 20 according to the discharge of fluid from the cylinder 80, this discharge being directed through the bleeder valve 89. The rapidity with which the cylinder 80 is bled off and accordingly, the speed to which the table moves inwardly toward the belt, is determined upon the setting of the valve 89 which can be conveniently manipulated from either side of the machine by handles 94 on shaft 93, and also by the initial compression of spring 78 as determined by adjustment of plug 77, these adjustments being made according to the work being machined, as to material, size of work, etc.

The base 40 is formed with a rectangular slot 105 at its rear edge, and the intermediate member 43 is formed with a depending arm 106 provided with an aperture to receive a rod 107 which is threaded in the base 40 and which is provided at its inner end with an enlarged head 109 which is engaged by the depending arm 106 and accordingly forms a stop to control the inward movement of the table. The outer end of the rod is provided with a knurled collar 110 for convenient manipulation of the rod, and a graduated dial 111 is frictionally mounted on the rod intermediate the collar 110 and a stationary block 112, whereby the rod 107 may be adjusted with precision.

The base 40 is provided with a screw 115 threading into the base member 40 and having an inwardly extending stem 114 arranged to be engaged by piston 81. The purpose of this arrangement is to limit the outward movement of the piston 81. If the screw 115 is adjusted so that the inner end of the stem 114 is engaged by the piston 81 previous to the outer limit of movement of the intermediate member 43 and table 54, as illustrated in Figure 6, the table, upon the compression of spring 78, will move inwardly rapidly until the stud 82 engages piston 81 and from then on, the table will move in gradually according to the setting of the bleeder valve 89. That is, the table will be moved in rapidly until the work mounted on the table is about to engage the abrasive belt, and the work will then be fed gradually into the belt during the cutting operation.

It will be observed, from the description thus far, that the table is automatically moved inwardly toward the belt and that this movement can be effected to any desired distance by adjustment of stop 107. Also, movement of the table toward and from the abrasive belt, relative to the transverse position of the table, can be controlled by adjusting the position of the members 96, 97, on the front of the table. Upon transverse movement of the table from the operating position to the loading and unloading position, that is, to the right (Figure 1), the member 96 engages the handle 70 moving it in a counterclockwise direction, Figure 3. During the initial portion of this movement, the member 74 moves toward the inner end of the handle until the pin 73 engages the inner end of the slot 79. Thereupon, the link 71 is moved outwardly effecting outward movement of the intermediate member 43, and of the table. The pin 82, carried by the intermediate member, also moves outwardly permitting the piston 81 to move outwardly until it engages the stop screw 114 and thereupon, the cylinder 80 is replenished with fluid. In the fluid system described, the cylinder 80 is replenished because of the maintenance of slight pressure on the fluid in the system by the circulating pump 29. However, if the fluid is taken from an open reservoir or from the atmosphere, if air operated, the piston 81 may be returned by inserting a spring 119 between the end of the piston and the inner end of the cylinder 80. The pressure is effected by the spring 78 to feed the table inwardly toward the abrasive belt may be adjusted by varying the initial pressure on the spring. This is accomplished by adjusting the screw 76 which, when threaded inwardly, forces the member 77 against the spring. The adjustment may be conveniently effected by a wrench 120 having an end portion 121 complemental to the recess in the outer end of the screw 76, and the wrench may be graduated, as at 122, so that the operator may know the degree to which the adjustment has been made.

As previously stated, the machine is employed for precision grinding and, as an aid to the operator, a dial indicator 124 is mounted upon a bracket 125 secured to the intermediate member 43, the dial having a stem 126 coacting with the adjacent leg 42 of the base member 40. The dial is convenient in determining the rapidity of the inward feed of the table, and also in adjusting the stop 107 with precision.

The general arrangement above described results in a very efficient machining operation. It will be observed that the members 96, 97 are or can be so adjusted that the table stays in its inner position with the work engaging the abrasive belt while the table is moved back and forth laterally during the cutting operation and until the work traverses the width of the belt before the table is moved outwardly from the belt. This results in a perfectly uniform cutting operation, wherein the cutting operation on all points of the work is performed at the same uniform speed and the wear on the abrasive belt is uniformly distributed over the entire width of the belt. This not only produces a more uniform and a flatter finish but adds materially to the cutting life of the belt and is a marked advantage in connection with clamping work on the table. In view of the fact that the cutting forces are in the same parallel direction and are evenly and uniformly distributed, it is only necessary to have a fixture of the type that will position the work, it not being necessary in the least to employ a heavy fixture to rigidly clamp the work, as is the case in milling machine operations and belt grinding operations, where an oscillating table is employed.

Figure 8:
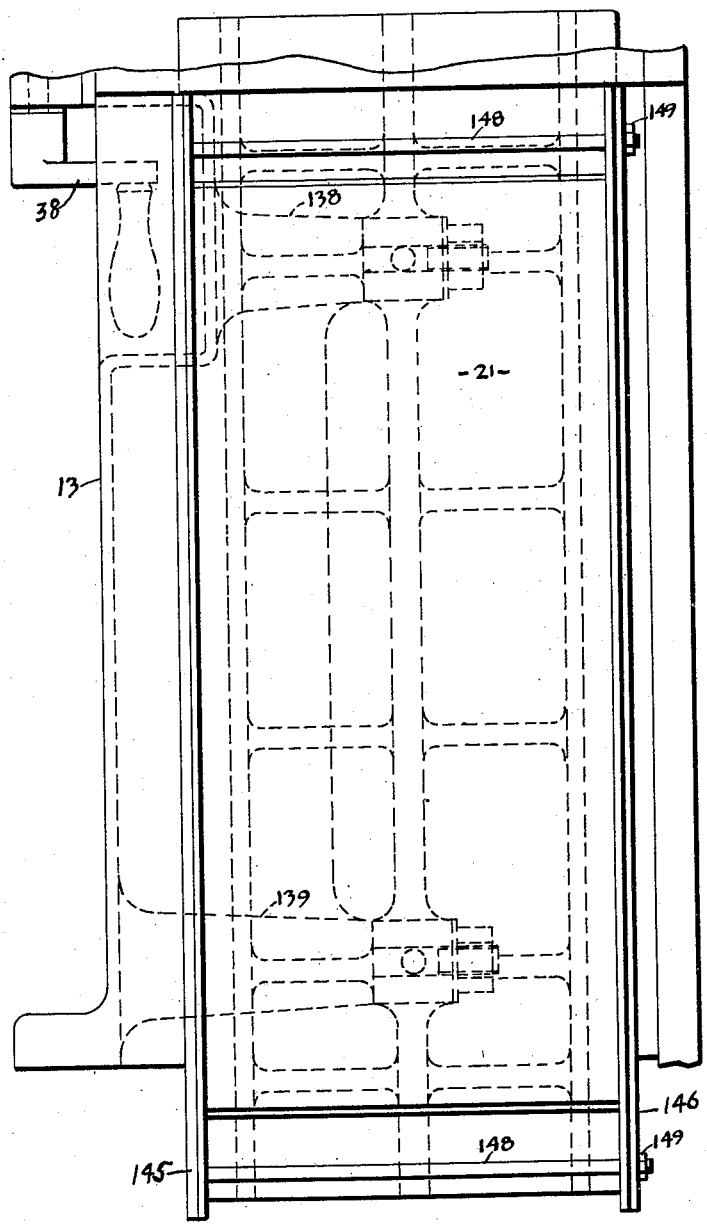
Figure 8 is a front elevational view of the upper portion of the housing with parts shown in dotted outline.

The platen 21 is carried by a supporting member 130 which is in the form of an elongated plate 131 formed on its rear surface with a plurality of transversely extending ribs 132, and with ribs 133 extending lengthwise in proximity to the edges of the plate 131, and a heavier rib 134 also extending lengthwise and arranged intermediate the ribs 133. The rib 134 is formed with rearwardly extending bosses 135 formed with elongated openings 136 to receive mounting studs 137 threading into the bosses 138, 139, extending inwardly from the left side of the housing 13, see Figures 8 and 9. The elongated openings 136 are to permit adjustment of the platen toward and from the abrasive belt and to square the platen with the work table 54. The platen support 130 is maintained in adjusted position by screws 140 threaded through bosses formed on the inner wall of the housing 13 and engaging the rear end of the bosses 135 of the support, see Figure 9.

The edges of the plate portion 131 are beveled as at 142. The platen 21 is adapted to be mounted on the surface of the plate portion 131, and the edges of the platen are likewise beveled, as shown at 143. The platen is movable vertically on the platen support and is clamped thereto by clamp members 145, 146. These members are somewhat V shaped, or formed complemental to the angular surfaces 142, 143 on the edges of the support and the platen. The arrangement is such that as the clamp members 145, 146 are drawn inwardly, the platen is wedged and clamped tightly against the face of the platen support. This clamping action is accomplished by rods 148 which are secured at like ends in the clamping member 145 and provided with a nut 149, and their opposite ends engaging the clamping member 146. The clamping members 145, 146 extend lengthwise of the platen and are somewhat longer than the platen, and there is a tie rod 148 arranged above and below the platen.

This arrangement has a number of advantages in that it permits the platen 21 to be formed of the most suitable material, such as steel alloy hardened and ground flat, or other wear resistant material, such as glass or ceramic material. It will be understood that the platen wears considerably in the vicinity of where the work is pressed against the abrasive belt. Accordingly, it is desirable to have the platen of extreme hardness and to have it adjustable vertically, so that when the platen wears in one spot, it can be adjusted to bring a new surface behind the abrasive belt where the same is engaged by the work.

Heretofore, platens in grinding machines of this type were provided with a plurality of holes to receive bolts or screws which were used to fasten the platen to the frame of the machine, or to the platen support. These apertures usually resulted in cracks or checks if the platen were heat treated to give extreme hardness. Also, any adjustment of the platen had to be such as provided by the spacing of the holes. With the platen structure above described, there are no apertures or other uneven cross sections to adversely affect the hardening of the platen, and the platen can be adjusted and clamped in adjusted position at any point throughout its length. By the same token, the platen can be formed of glass or other hard, brittle material. The bevel 143 on the platen extends through half of the thickness of the platen, and the remaining thickness of the edges is also beveled, as indicated at 150. This permits the platen to be reversed and the opposite side used before it becomes necessary to recondition the platen. Because the platen is a flat plate of uniform thickness, it is conveniently reconditioned by simply grinding both surfaces of the platen.

As previously stated, the belt 20 is flushed with coolant discharged from the nozzle 34. This coolant is transferred to the work during the cutting operation and a large portion of it collects on the table 54. A collecting trough 155 is mounted on the inner edge of the table, with the bottom portion of the trough inclining downwardly from each end toward the center. This trough is arranged to collect the coolant that flows over the inner end of the table, and a shield member 156 is secured along the lower portion of the inner side edge of the table and extends downwardly into the trough 155 and serves to direct the coolant into the trough, whereby the coolant is prevented from following the table and base member and being discharged on the external surface of the machine. The bottom wall of the trough 155 is provided with an opening arranged centrally to discharge the coolant into the chip drawer 24.

What I claim is:

1. A machine tool of the abrasive belt type comprising an enclosed housing having an opening in one side thereof, a support arranged in juxtaposition to the lower portion of said opening and extending outwardly therefrom, pulleys journalled in the upper and lower ends of said housing, an abrasive belt trained over said pulleys and having a portion exposed to said opening, a base member mounted upon said support, an intermediate member slidably mounted on the base member and being movable toward and from said belt, stop means cooperable to limit the movement of said intermediate member, a work table slidably mounted on said intermediate member and movable transversely of the belt from a loading and unloading station to an operating station, a toggle including a lever pivoted to one of said members, and a link pivotally connected to the other member, the connection between said lever and link including a spring, said lever being operable, when moved about its pivot in one direction to put said spring under compression, said spring when under compression yieldingly urging the intermediate member toward said belt, dash pot means cooperable with said base and said intermediate member to oppose movement of the latter towards the belt, means carried by the table and cooperable with said lever to move it into spring compression position when said table is moved from the loading and unloading station toward the operating station.

2. A machine tool of the abrasive belt type comprising a housing formed with an opening in one side, a pair of pulleys journalled in the housing, an abrasive belt trained over said pulleys and having a portion exposed through said opening, a platen support secured in the housing, a platen positioned on said support to back up the exposed portion of said belt, said platen comprising a plate formed at its side edges with surfaces beveled in opposite directions, and clamp means cooperable with the edges of said support and the beveled surfaces of said plate extending in one direction to clamp one side of said plate against said support, and cooperable with the beveled surfaces of said plate extending in the opposite direction to clamp the opposite side thereof against the support, all whereby said plate is reversible.

3. A machine tool of the abrasive belt type comprising a housing formed with an opening in one side, a pair of pulleys journalled in the housing, an abrasive belt trained over said pulleys and having a portion exposed through said opening, a platen support secured in the housing, a platen positioned on said support to back up the exposed portion of said belt, said platen comprising a plate having the side edges thereof beveled, the side edges of said support being beveled in the opposite direction to the beveled edges of said plate, V-shaped members extending lengthwise along the edges of said support and plate, a pair of tie rods extending transversely of said support and which, in conjunction with said V shaped members, form a clamping device to clamp said plate to said support.

4. A machine tool of the abrasive belt type comprising an enclosed housing having an opening in one side thereof, a support arranged in juxtaposition to the lower portion of said opening and extending outwardly therfrom, pulleys journalled in the upper and lower ends of said housing, an abrasive belt trained over said pulleys and having a portion exposed to said opening, an intermediate member sildably mounted on said support and movable toward and from the face of the belt, a work table slidably mounted on said intermediate member and movable transversely of and parallel to the face of the belt to move a work piece carried by the table from a work loading position to a work abrading position, a feeding means cooperable, when actuated, with said support and said intermediate member to yieldingly move said intermediate member and the table toward the belt and to move the work piece into abrading engagement with the belt, an actuator carried by the table and operable to actuate said feeding means during movement of the table from the work loading position to the work abrading position, and a dash pot means cooperable with said support and said intermediate member to yieldingly oppose movement of the table by said feeding means toward the belt.

5. A machine tool of the abrasive belt type comprising an enclosed housing having an opening in one side thereof, a support arranged in juxtaposition to the lower portion of said opening and extending outwardly therefrom, pulleys journalled in the upper and lower ends of said housing, an abrasive belt trained over said pulleys and having a portion exposed to said opening, an intermediate member slidably mounted on said support and movable toward and from the face of the belt, a work table slidably mounted on said intermediate member and movable transversely of and parallel to the face of the belt to move a work piece carried by the table from a work loading position to a work abrading position, a feeding means cooperable, upon actuation, with said support and said intermediate member to yieldingly move said intermediate member and the table carried thereby toward the belt, stop means carried by the support and cooperable with said intermediate member to limit movement of the latter toward the belt, and dash pot means cooperable with said support and said intermediate member to oppose movement of the latter by said feeding means.

FRASER A. HURD.

REFERENCES CITED

The following references are of record in the file of this patent:

UNITED STATES PATENTS

| Number | Name | Date |
| --- | --- | --- |
| 877,199 | Joy | Jan. 21, 1908 |
| 921,343 | Bastian et al. | May 11, 1909 |
| 956,645 | Moore | May 3, 1910 |
| 998,351 | Kroeze | July 18, 1911 |
| 1,664,983 | Kimmel | Apr. 3, 1928 |
| 1,701,814 | Maddox | Feb. 12, 1929 |
| 1,841,411 | Rux | Jan. 19, 1932 |
| 1,938,875 | Stratton | Dec. 12, 1933 |
| 2,089,808 | Ocenasek | Aug. 10, 1937 |
| 2,307,019 | Cebik | Jan. 5, 1943 |

FOREIGN PATENTS

| Number | Country | Date |
| --- | --- | --- |
| 378,450 | Great Britain | Aug. 9, 1932 |
| 446,352 | France | Sept. 30, 1912 |